United States Patent [19]

Kobashi et al.

[11] 4,062,857

[45] Dec. 13, 1977

[54] PROCESS FOR PRODUCING ACRYLONITRILE POLYMER MELT

[75] Inventors: Toshiyuki Kobashi; Masahiko Ozaki; Kenichi Ono, all of Okayama, Japan

[73] Assignee: Japan Exlan Company Limited, Osaka, Japan

[21] Appl. No.: 738,699

[22] Filed: Nov. 4, 1976

[30] Foreign Application Priority Data

Nov. 7, 1975 Japan ............................. 50-134516

[51] Int. Cl.$^2$ .................... C08F 220/44; C08L 33/20
[52] U.S. Cl. ............................ 260/29.6 AN; 264/182; 264/206; 526/303; 526/317; 526/328; 526/330; 526/342

[58] Field of Search ............... 526/342; 260/29.6 AN, 260/29.6 R

[56] References Cited

U.S. PATENT DOCUMENTS

| | | | |
|---|---|---|---|
| 3,701,761 | 10/1972 | Ashina et al. | 526/342 |
| 3,873,508 | 3/1975 | Turner | 260/29.6 AN |

*Primary Examiner*—Harry Wong, Jr.
*Attorney, Agent, or Firm*—Wenderoth, Lind & Ponack

[57] ABSTRACT

Process for producing an acrylonitrile polymer in a substantially melted state by polymerizing a monomer mixture composed mainly of acrylonitrile in the presence of water under a pressure above the autogenous pressure at a temperature of from 80° to 120° C so as to attain a polymerization rate of at least 45%.

10 Claims, No Drawings

PROCESS FOR PRODUCING ACRYLONITRILE POLYMER MELT

The present invention relates to an improved process for producing an acrylonitrile polymer melt. More specifically, the invention relates to a process for producing an acrylonitrile polymer in a substantially melted state, in an industrially advantageous manner, by polymerizing a monomer mixture composed mainly of acrylonitrile in the presence of water under a pressure above the self-generated (autogeneous) pressure at a temperature of from 80° to 120° C. so as to attain a polymerization rate (conversion) of at least 45%.

In recent years, it has been found that, when an acrylonitrile polymer is treated at high temperature under increased pressure in the presence of a small quantity of a non-solvent, the polymer and the non-solvent form a homogeneous fluid phase to show a fluidity like a melt of polyesters or polyamides. To produce fibers by spinning such a fluid (hereinafter referred to as "melt"), a number of processes have been proposed as found, for example, in U.S. Pat. No. 3,338,202, disclosed Japanese Pat. application Nos. 28,982/1973, 49,839/1973 and 52,832/1973. Most of these processes use water as the non-solvent for the acrylonitrile polymer, and thus they constitute a characteristic feature in producing acrylonitrile synthetic fibers without the use of conventional expensive solvents like dimethylformamide, dimethyl sulfoxide, aqueous solutions of thiocyanates, concentrated nitric acid, etc.

By applying this melting phenomenon to a polymerization system, there has been proposed, as in U.S. Pat. No. 3,873,508, a process for the production of an acrylonitrile polymer melt simultaneously with the polymerization of acrylonitrile, and since then processes using acrylonitrile melts in the production of fibers, etc., are receiving attention from the viewpoint of process simplification, cost reduction, material economy, prevention of environmental pollution, etc.

In all these processes, however, the acrylonitrile polymer is melted in the presence of water and therefore a pressurized high-temperature condition exceeding one hundred and several ten degrees is employed. Accordingly, these processes involve various problems awaiting solution in the quality of the resulting polymer and industrial operations, including discoloration of the polymer, danger due to high-temperature operations, increase in energy costs due to high-temperature maintenance, ensurance of safety, reduction in costs, etc.

In view of this situation, we made a study to overcome such drawbacks of the known processes. As a result, we have found that a homogeneous fluid of an acrylonitrile polymer which is less colored and in a substantially melted state can be produced by polymerizing a monomer mixture composed mainly of acrylonitrile, in the presence of a specific quantity of water, under a pressure above the self-generated pressure at a relatively low temperature below 120° C., until a particular conversion is attained.

A ffirst object of the presennt invention is to produce an acrylonitrile polymer in a substantially melted state, in an industrially advantageous manner.

A second object of the present invention is to provide a process for converting a monomer mixture composed mainly of acrylonitrile into a uniform fluid polymer in a substantially melted state, by a polymerization operation at a relatively low temperature and in a short time.

A third object of the present invention is to produce a less colored, high quality acrylonitrile polymer melt which can be directly provided to operations of shaping such as spinning, film formation and extrusion shaping, by an energy-economizing, high-productive and simplified process with an easy industrial operation.

Further objects of the present invention will become apparent from the following concrete description of the invention.

These objects of the present invention can be achieved by polymerizing a monomer mixture consisting of 50 to 98 mol percent acrylonitrile and the remainder of another ethylenically unsaturated monomer in a system in which water is present in a quantity in the range of from 3 to 60 weight percent based on the total amount of the monomer mixture and water, under a pressure above the self-generated pressure at a temperature of from 80° to 120° C., thereby converting at least 45 weight percent of said monomer mixture into a polymer, and thereafter heating the thus-obtained polymer to 130° to 250° C. according to need.

We do not fully understand the exact reason for the phenomenon in which the acrylonitrile polymer is melted (i.e., forms a homogeneous fluid phase together with water) under a specific polymerization condition of relatively low temperature under increased pressure. However, when an acrylonitrile polymer powder obtained otherwise is mixed with a monomer mixture and water in the same ratio as the above-mentioned melt and the whole mixture is heated under the self-generated pressure at a temperature of from 80° to 120° C. for several hours (without causing polymerization), said acrylonitrile polymer cannot be melted. This fact leads one to hypothesize that a proper coexistence of water and the monomer mixture in the course of forming the acrylonitrile polymer may exert a complicated influence on greatly weakening the cohesive power caused by the interaction of —C≡N groups between the molecular chains of the acrylonitrile polymer.

The polymerization process according to the present invention is applicable to the polymerization of a monomer mixture consisting of 50 to 98 mol percent acrylonitrile and the remainder composed of at least one different ethylenically unsaturated compound. Among the different ethylenically unsaturated compounds, i.e., the copolymeric components, there may be mentioned well-known unsaturated compounds copolymerizable with acrylonitrile, for example: vinyl halides and vinylidene halides such as vinyl chloride, vinyl bromide, vinylidene chloride; unsaturated carboxylic acids such as acrylic acid, methacrylic acid, maleic acid, itaconic acid, and their salts; acrylic acid esters such as methyl acrylate, ethyl acrylate, butyl acrylate, octyl acrylate, methoxyethyl acrylate, phenyl acrylate, cyclohexyl acrylate; methacrylic acid esters such as methyl methacrylate, ethyl methacrylate, butyl methacrylate, octyl methacrylate, methoxyethyl methacrylate, phenyl methacrylate, cyclohexyl methacrylate; unsaturated ketones such as methyl vinyl ketone, phenyl vinyl ketone, methyl isopropenyl ketone; vinyl esters such as vinyl formate, vinyl acetate, vinyl propionate, vinyl butyrate, vinyl benzoate; vinyl ethers such as methyl vinyl ether, ethyl vinyl ether; acrylamide and its alkyl substitution compounds; unsaturated sulfonic acids such as vinylsulfonic acid, allylsulfonic acid, methallylsulfonic acid, p-styrene-sulfonic acid, and their salts; styrenes such as styrene, α-methylstyrene, chlorostyrene, and their alkyl or halogen substitution compounds; allyl alcohol and its esters or ethers; basic vinyl compounds such as vinylpyridine, vinylimidazole, dimethylaminoethyl methacrylate; unsaturated aldehydes such as acrolein, methacrolein; unsaturated nitriles such as methacrylonitrile, vinylidene cyanide; cross-linkable vinyl compounds such as glycidyl methacrylate, N-methylolacrylamide, hydroxyethyl methacrylate, divinylbenzene, ethylene glycol diacrylate.

In the case where the ratio of acrylonitrile in the monomer mixture is in excess of 98%, it becomes difficult to obtain the polymer melt by the polymerization conditions according to the present invention. To obtain an acrylonitrile polymer melt to be used for shaped products, a monomer mixture in which acrylonitrile constitutes more than 50 mol percent is generally used. Particularly, however, when a monomer mixture containing more than 80 mol percent acrylonitrile is used, the feature of the polymerization process according to the present invention will be better displayed.

In the polymerization process according to the present invention using such a monomer mixture, it is necessary that water should be present in a quantity in the range of from 3 to 60 weight percent, preferably 5 to 50 weight percent, and for best results 10 to 35 weight percent, based on the total amount of the monomer and water forming the polymerization system. If less than 3 weight percent, the melting of the acrylonitrile polymer will become extremely difficult, and the polymer takes on an appearance as in mass polymerization, resulting in a heterogeneous chalky polymer. On the other hand, where the quantity of water in the polymerization system is too much, there will be a difficulty in obtaining a homogeneous melt, accompanied with further troubles such as low productivity. It is necessary that the polymerization system should be maintained under a pressure above the self-generated pressure, namely under a pressure above the vapor pressure generated in the polymerization system under the polymerization conditions. Also, it is necessary to employ as the polymerization temperature, a temperature within the range of from 80° to 120° C., preferably from 85° to 115° C., and more preferably from 90° to 110° C. The employment of too high temperature will cause deteriorations in the quality of the resulting polymer, such as decomposition and discoloration. In addition, such a temperature involves various problems in energy costs and industrial operations. On the other hand, a polymerization temperature lower than 80° C. will make the melting of the resulting polymer extremely difficult.

To obtain the acrylonitrile polymer melt of the present invention under such polymerization conditions, it is necessary to continue polymerization until the ratio of conversion of the monomer mixture supplied to the polymerization system to the polymer (i.e., the polymerization ratio) becomes at least 45% by weight, preferably more than 50% by weight, most preferably about 55% to about 97% by weight. Only by attaining such a polymerization ratio, can the resulting acrylonitrile polymer, even under the above-mentioned low-temperature pressurized conditions, be converted to a transparent polymer fluid in a substantially melted state. On the other hand, where the polymerization ratio does not attain 45%, the resulting polymer will separate out in the polymerization system, giving a slurry-like or chalky polymer. Such a polymer is difficultly melted on standing even under the temperature-pressure conditions according to the present invention. In this connection, with the polymerization under the high-temperature condition (120° – 215° C.) as described in the above-mentioned U.S. Pat. No. 3,873,508, when the polymerization is carried out at a polymerization ratio less than 45% to form an unmelted polymer, it can be converted to a perfect melt on standing at this temperature (120° – 215° C.) for 10 to 60 minutes. In consideration of this fact, with the feature of the present invention, the above-mentioned limitation in the polymerization ratio for obtaining the polymer melt is apparently characteristic of the low-temperature pressurized polymerization process according to the present invention.

The polymerization according to the present invention is performed in a closed system or in a polymerization apparatus equipped with a suitable pressurizing means to maintain a pressure above the vapor pressure generated in the polymerization system under the polymerization conditions (the self-generated pressure), generally 2 to 3 atmospheres or above. For the polymerization pressure, any pressure may be used which is above the vapor pressure (the self-generated pressure). For example a high pressure above 100 atmospheres, or even above 1000 atmospheres may be used for the polymerization operation according to the present invention. However, it is suitable to perform the polymerization generally under a pressure between about 3 atmospheres and about 5 atmospheres, in view of the ease of industrial operation and for the facility of removing the resulting polymer melt to shape it into fibers or films.

There are cases that the acrylonitrile polymer melt, as it stands after the polymerization, obtained according to such polymerization conditions, may be heat-treated, if necessary, at 130° to 250° C. under a pressure above the self-generated pressure to obtain a lowered viscosity of the melt and to improve the melting behavior, thereby to heighten the productivity in the processing (shaping) step or to improve the quality of the shaped product. In this heat treatment, the progression of polymerization is not a necessary condition, i.e., the polymer melt may be heat-treated after the termination of polymerization. This process of producing an acrylonitrile polymer melt by the two heating steps composed of the low-temperature pressurized polymerization and the heat treatment at 130° to 250° C., can shorten the time of high-temperature thermal history as compared with the high-temperature (120° – 215° C.) pressurized polymerization process only. Therefore, by performing the major part of the polymerization stage at the low-temperature region (80° – 120° C.), this process achieves not only the effect of suppressing the thermal discoloration of the polymer but also the effect of suppressing the polymer discoloration and denaturation due to the action of radicals.

For the polymerization-initiating means used in the present invention, all known methods can be used, for example radical polymerization using radical-generating agents such as peroxides, azo compounds, etc.; direct photo-polymerization under ultraviolet ray irradiation or photo-sensitized polymerization in the presence of a photo-sensitizer; polymerization under γ-ray irradiation. The selection of these means is suitably determined according to the polymerization conditions and polymerization apparatus employed and the use of the resulting polymer. Among the radical-generating agents, there may be mentioned hydrogen peroxide, t-butyl peroxypivalate, 3,5,5-trimethylhexanoyl peroxide, octanoyl peroxide, decanoyl peroxide, lauroyl peroxide, stearoyl peroxide, propionyl peroxide, succinic acid peroxide, acetyl peroxide, t-butyl peroxy-2-ethyl hexanoate, benzoyl peroxide, t-butyl peroxymaleic acid, azobis-isobutyronitrile, p-chlorobenzoyl peroxide, t-butyl peroxylaurate, cyclohexanone peroxide, t-butyl peroxyisopropyl carbonate, 2,5-dimethyl-2,5-di(benzoyl peroxy)hexane, t-butyl peroxyacetate, t-butyl peroxybenzoate, di-t-butyl peroxyphthalate, methyl ethyl ketone peroxide, dicumyl peroxide, 2,5-dimethyl-2,5-di(t-butyl peroxy)hexane, t-butyl cumyl peroxide, t-butyl hydroperoxide, di-t-butyl peroxide, etc. These radical-generating agents can be used singly or in combination of two or more. Also, it is frequent practice to use one or more of these radical-generating agents in combination with one or more compounds selected from the group consisting of primary through tertiary amines, formic acid, phenylhydrazine, reductive sulfoxy compounds (sulfurous acid, sulfites, hydrosulfites, bisulfites, metabisulfites, etc.), phenylsulfinic acid, tetraphenylhydrazine, etc. The quantity of such an initiating agent is selected within the range of generally 0.01 to 3 weight percent, preferably 0.1 to 2 weight percent, based on the weight of the monomer mixture.

For the molecular weight control of the polymer formed in the present invention, well-known chain transfer agents, such as amines, alcohols, substituted benzenes, chloroform, mercapto compounds, ketones, can be used besides using the method of varying the quantity of the catalyst to be added and the method of varying the irradiation intensity of light or $\gamma$-ray. To suppress a rapid polymerization reaction in the early stage of the polymerization and thus to avoid a steep rise of pressure, addition of a polymerization retarder to the polymerization system is frequently practiced. It is also permissible to add, to the polymerization system, additives for improving the properties of the resulting polymer, for example anti-discoloration agents, stabilizer against heat, flame retardants, antistatics, stabilizers against ultraviolet ray, pigments, etc., in a quantity within the range in which they do not adversely effect the polymerization according to the present invention.

The polymerization time in the process of the present invention is varied depending on the means for initiating the polymerization, the type and quantity of the catalyst to be used, the polymerization temperature, etc., but a duration of generally 5 minutes to 2 hours, preferably 20 minutes to 1 hour is employed. It can be enumerated as one of the advantages of the present invention that the low-temperature pressurized polymerization according to the present invention can be performed in a short time. The polymerization reaction according to the present invention may be carried out by a batch method or a continuous method or by a method in which both are combined together.

The transparent, homogeneous acrylonitrile polymer fluid in a substantially melted state produced according to the polymerization process of the present invention may be provided directly or after separation of the polymer melt from the water phase, for spinning, film formation or shaping. Thus, said melt is suitable for extrusion directly into a zone characterized by lower temperature and pressure than in the reactor to form fibers or films. Besides, the polymer melt, after a solvent for the acrylonitrile polymer (for example an aqueous solution of an inorganic salt such as zinc chloride, thiocyanate; inorganic solvent such as nitric acid; organic solvent such as dimethylformamide, dimethylacetamide dimethyl sulfoxide, butyrolactone, ethylene carbonate, etc.) has been introduced thereto under pressure and mixed therewith, may be formed in the usual way into fibers by wet-spinning or dry-spinning, or into films.

Further, when the pressure within the reactor containing the hot polymer melt is decreased there can be obtained a form of the polymer.

In the present invention, as the practical polymerization ratio, a value within the range of from about 55% to about 97% is employed. Therefore, a certain quantity of unreacted monomer remains in the melted polymer obtained. But the unreacted monomer is recovered by some suitable means in the step of spinning, film formation or shaping and can be reused.

By the process of the present invention, the polymerization step can be extremely simplified, and at the same time the quantity of water and heat energy to be used can be markedly reduced. Furthermore, shaped products can be obtained without using any solvent and thus the process has an advantage that the recovery of the solvent and the problem of its high-degree purification can be avoided. Moreover, because the polymerization in the present invention is performed in a homogeneous phase, the heat transfer is easy. Accordingly, heat accumulation in the polymerization system and a runaway reaction can be suppressed and the polymerization reaction product can be made homogeneous. In addition, because the polymer becomes fluid at the same time with the polymerization, the transport (transfer) of the polymer is easy. These are advantageous features of the present invention upon industrial practice.

Because the process of the present invention is performed at a relatively low-temperature region (80°–120° C.), inexpensive, safe heat sources can be used. This makes the process industrially very advantageous in energy costs and polymerization operation and from the viewpoint of reaction apparatus and productivity. Furthermore, a remarkable feature is seen in that the simultaneous practice of the polymerization step and the melting step is very advantageous for the simplification of the process.

As other features of the process of the present invention, there can be recited: very little by-products in the polymerization step (consequently the reduction of the loss of monomers), the suppression of discoloration of the polymer and the uniformity of the molecular weight of the resulting polymer.

The present invention will be explained in further detail by way of examples, but the scope of the invention is not limited by these examples. In the examples, parts and percentages are by weight unless otherwise specified. The APHA number (American Public Health Association Number) mentioned in the examples is the calculated value by the APHA standard curve, of the degree of absorbance for a transmitted light of 430 m$\mu$ through a sample solution of 0.4 g polymer in 20 ml dimethylformamide. The greater this number, the greater is the degree of discoloration.

EXAMPLE 1

There was mixed with a monomer mixture consisting of 91 mol percent acrylonitrile (AN) and 9 mol percent methyl acrylate (MA), 0.5%, based on the monomer mixture, of di-tert-butyl peroxide, as the catalyst, which was dissolved therein. Thereafter, eight parts of this monomer solution and two parts of water were placed in hard glass tubes, each 5 mm. in inner diameter and 150 mm. in length, with the lower end closed. After the air in the vacant space of the glass tubes had been replaced with nitrogen gas, the glass tubes were fusion-enclosed. Each of the glass tubes containing the reaction mixture was allowed to stand still in an oil bath and the mixture solution was polymerized under the various condition shown in Table 1. In every case, a transparent, viscous polymer in a substantially melted state was obtained. The polymerization results are shown in Table 1.

As apparent from the results in Table 1, the degree of discoloration of the resulting polymers can be greatly suppressed by employing polymerization temperatures below 120° C.

When only the monomer solution (without the presence of water) was enclosed in the glass tube and polymerized under the same conditions as in Table 1, a white or yellow chalky polymer showing no fluidity was obtained at every polymerization temperature.

Table 1

| No. | Polymerization temp. (° C.) | Polymerization time (min.) | Conversion (%) | APHA number | Color of the melt |
| --- | --- | --- | --- | --- | --- |
| 1 | 100 | 420 | 71.9 | 120 | Colorless |
| 2 | 115 | 60 | 69.7 | 170 | " |
| 3 | 120 | " | 82.9 | 200 | Pale yellow |
| 4 | 140 | " | 90.4 | 450 | Yellow |
| 5 | 160 | " | 90.8 | 620 | " |

EXAMPLE 2

To a monomer mixture consisting of 91 mol percent acrylonitrile and 9 mol percent methyl acrylate, various initiators shown in Table 2 were added respectively. Eight parts of this monomer solution and two parts of water were put in glass tubes in the same way as in Example 1, and were fusion-enclosed.

The reaction mixture in the glass tubes was polymerized at the various temperatures and for the various times shown in Table 2, and the polymerization results shown in the same table were obtained. It is apparent from the results in Table 2 that a polymerization temperature above 80° C. and a polymerization ratio above 45% are necessary for obtaining an acrylonitrile polymer melt.

EXAMPLE 3

In a monomer mixture consisting of 91 mol percent acrylonitrile and 9 mol percent methyl acrylate, 0.5% (based on the monomer mixture) AIBN or 0.6% (based on the monomer mixture) BPO was dissolved. The monomer solution was enclosed in glass tubes together with water at the various ratios shown in Table 3. The polymerization mixture in the glass tubes was polymerized under the various conditions shown in Table 3, and the polymerization results shown in the same table were obtained. As apparent from the results in Table 3, a polymer melt can be obtained only by the presence of a specific quantity of water and by attaining a polymerization ratio above a specific value.

Table 3

| No. | Initiator | Monomer/water (Ratio by wt.) | Polymerization conditions Temp. (° C.) | Time (min.) | Conversion (%) | Molecular wt. | Appearance of the polymer |
| --- | --- | --- | --- | --- | --- | --- | --- |
| 16 | AIBN | 90/10 | 100 | 2 | 37.3 | — | Not melted |
| 17 | AIBN | 90/10 | 100 | 15 | 82.2 | 88,000 | Melted |
| 18 | AIBN | 80/20 | 100 | 30 | 69.5 | 75,600 | Melted |
| 19 | BPO | 100/0 | 110 | 60 | 60.9 | 55,600 | Melted |
| 20 | BPO | 95/5 | 110 | 60 | 72.8 | 80,200 | Melted |
| 21 | BPO | 80/20 | 110 | 60 | 72.2 | 68,000 | Melted |
| 22 | BPO | 50/50 | 110 | 60 | 73.2 | 71,300 | Melted |
| 23 | BPO | 20/80 | 110 | 60 | 62.0 | 72,100 | Partly melted |

EXAMPLE 4

Eight parts of the various monomer mixture solutions shown in Table 4 in which 0.8% (based on the monomer mixture) SIBN or 0.6% (based on the monomer mixture) BPO had been dissolved as the initiator was respectively mixed with 2 parts of water. These monomer mixture solutions were then fusion-enclosed in glass tubes and were polymerized at 100° C. or 110° C. for 60 minutes. These polymers thus obtained, except the No. 24 polymer, were homogeneous, transparent and fluid in a substantially melted state and were substantially free from discoloration.

Table 2

| No. | Initiator Name | Quantity (%) | Polymerization temperature (° C.) | Polymerization time (min.) | Conversion (%) | Molecular weight | Appearance of the polymer |
| --- | --- | --- | --- | --- | --- | --- | --- |
| 6 | AIBN | 0.5 | 75 | 60 | 79.3 | — | Chalky |
| 7 | AIBN | 0.5 | 80 | 60 | 87.1 | 130,500 | Melted |
| 8 | AIBN | 1.2 | 90 | 15 | 89.5 | 83,200 | Melted |
| 9 | AVN | 1.0 | 100 | 60 | 43.6 | 61,000 | Chalky |
| 10 | AIBN | 0.5 | 100 | 5 | 42.9 | — | Chalky |
| 11 | AIBN | 0.5 | 100 | 15 | 65.7 | 75,600 | Melted |
| 12 | BPO | 0.6 | 110 | 60 | 70.2 | 68,000 | Melted |
| 13 | DBP | 0.5 | 115 | 60 | 69.7 | — | Melted |
| 14 | DBP | 1.0 | 120 | 15 | 29.9 | — | Chalky |
| 15 | DBP | 1.0 | 120 | 25 | 55.9 | 67,000 | Melted |

AIBN: Azobisisobutyronitrile
AVN: Azobisvaleronitrile
BPO: Benzoyl peroxide
DBP: Di-tert-butyl peroxide
(Note) In the experiments of Nos. 14 and 15, 0.8 % (based on the monomer mixture) of benzylamine was added.

Table 4

| No. | Monomer composition (mol ratio) | Initiator | Temperature (° C.) | Conversion (%) | Appearance of polymer |
| --- | --- | --- | --- | --- | --- |
| 24 | AN/MA=100/0 | AIBN | 100 | 93.8 | Not melted |
| 25 | AN/MA=94/6 | BPO | 110 | 75.6 | Melted |
| 26 | AN/MA=85/15 | BPO | 110 | 64.1 | " |
| 27 | AN/AA=92/8 | AIBN | 100 | 79.6 | " |
| 28 | AN/BA=85/15 | " | " | 74.6 | " |
| 29 | AN/AAm=92/8 | " | " | 84.3 | " |
| 30 | AN/ST=95/5 | " | " | 81.8 | " |
| 31 | AN/MMA=94/6 | " | " | 81.9 | " |
| 32 | AN/VAc=71/29 | " | " | 72.0 | " |

Table 4-continued

| No. | Monomer composition (mol ratio) | Initiator | Temperature (° C.) | Conversion (%) | Appearance of polymer |
|---|---|---|---|---|---|
| 33 | AN/VDC=78/22 | " | " | 70.1 | " |

AA: Acrylic acid
BA: n-Butyl acrylate
AAm: Acrylamide
ST: Styrene
MMA: Methyl methacrylate
VAc: Vinyl acetate
VDC: Vinylidene chloride

EXAMPLE 5

In a monomer mixture consisting of 91 mol percent acrylonitrile and 9 mol percent methyl methacrylate, 0.7% (based on the monomer mixture) of tert-butyl peroxybenzoate was dissolved as the catalyst. Then 8.5 parts of the monomer solution and 1.5 parts of water were fusion-enclosed in a hard glass tube. The glass tube was allowed to stand still in an oil bath at 110° C. for 60 minutes to polymerize the monomer mixture. A colorless transparent polymer in a substantially melted state was obtained. By further heating the glass tube containing the polymer for 60 minutes at 150° C., the fluidity of the polymer was increased.

On the other hand, for comparison, the monomer mixture was polymerized at 150° C. for 60 minutes. A melted polymer was obtained but it was colored yellow.

The above results of the polymerization and the degrees of discoloration (APHA numbers) of the polymers thus obtained are shown in Table 5. As apparent from the results in Table 5, the No. 34 polymer obtained according to the present invention is far less colored than the No. 36 polymer obtained by the conventional high-temperature pressurized process. Even in the case of the No. 35 polymer (present invention) having passed through a far longer thermal history than the No. 36 polymer, the discoloration is also markedly suppressed.

Table 5

| No. | Thermal history in the polymerization | Conversion (%) | APHA number |
|---|---|---|---|
| 34 | 110° C. × 60 min. | 90.8 | 239 |
| 35 | 110° C. × 60 min. +150° C. × 60 min. | 94.6 | 360 |
| 36 | 150° C. × 60 min. | 68.6 | 660 |

EXAMPLE 6

The process of the present invention was performed using a stainless steel autoclave of 700 ml. capacity equipped with a magnetic stirrer of partition well type and, at the bottom, a nozzle having a small orifice, 0.7 mm. in diameter. The jacket outside the autoclave was so constructed that polyethylene glycol, as heat transfer medium, was caused to circulate therein.

At the start of the polymerization, the nozzle orifice was closed. Then 85 parts of a monomer mixture consisting of 91 mol percent acrylonitrile and 9 mol percent methyl acrylate and 15 parts of water in which 1% (based on the monomer mixture) hydrogen peroxide had been dissolved, were poured through an inlet positioned at the upper part of the autoclave. After the air in the vacant space in the autoclave had been replaced with nitrogen, the inlet was closed. Thereafter, the polymerization reaction mixture in the autoclave was heated to 110° C. with a temperature rise speed of 4° C./min. while stirring the mixture and causing the heated polyethylene glycol to circulate. The reaction mixture was then maintained at this temperature for 1.5 hours to complete the polymerization. The self-generated pressure was about 10 kg/cm$^2$. The resulting polymer was further heated to 130° C. at a temperature rise speed of 4° C./min. Thereafter, by removing the plug of the nozzle orifice at the bottom of the autoclave, the polymer melt was extruded continuously and stably. Transparent, compact fibers were obtained from this polymer melt.

What we claim is:

1. A process for producing an acrylonitrile polymer melt which comprises polymerizing a monomer mixing consisting of 50 – 98 mol percent acrylonitrile and the remainder composed of at least one different ethylenically unsaturated compound in a system in which water is present in a quantity within the range of 3 – 60 weight percent based on the total amount of the monomer mixture and the water, under a pressure above the self-generated pressure, at a temperature of 80° – 120° C., to convert at least 45 weight percent of the monomer mixture to the acrylonitrile polymer.

2. A process as claimed in claim 1 wherein the polymerization is conducted at a temperature of 85° – 115° C.

3. A process as claimed in claim 1 wherein the polymerization is conducted at a temperature of 90° – 110° C.

4. A process as claimed in claim 1 wherein the polymerization is conducted in a system in which water is present in an amount of 5 – 50% by weight based on the total amount of the monomer mixture and water.

5. A process as claimed in claim 1 wherein the polymerization is conducted in a system in which water is present in an amount of 10 – 35% by weight based on the total amount of the monomer mixture and water.

6. A process as claimed in claim 1 wherein the content of acrylonitrile in the monomer mixture is above 80 mol %.

7. A process as claimed in claim 1 wherein more than 50% by weight of the monomer mixture is converted into the polymer.

8. A process as claimed in claim 1 wherein about 55 to about 97% by weight of the monomer mixture is converted into the polymer.

9. A process as claimed in claim 1 which further comprises heating the acrylonitrile polymer melt at 130° – 250° C.

10. A process as claimed in claim 1 wherein the polymer melt is prepared in a reactor and is directly extruded into a zone characterized by lower temperature and lower pressure than in the reactor, to form fibers or films.

* * * * *